(No Model.)

L. M. BOARDMAN.
AMALGAMATOR AND CONCENTRATOR FOR STAMP MILLS.

No. 330,817. Patented Nov. 17, 1885.

Witnesses

Inventor

UNITED STATES PATENT OFFICE.

LORENZO M. BOARDMAN, OF MINNEAPOLIS, MINNESOTA, ASSIGNOR OF ONE-HALF TO SUMNER LADD, OF SAME PLACE.

AMALGAMATOR AND CONCENTRATOR FOR STAMP-MILLS.

SPECIFICATION forming part of Letters Patent No. 330,817, dated November 17, 1885.

Application filed August 4, 1885. Serial No. 173,493. (No model.)

*To all whom it may concern:*

Be it known that I, LORENZO M. BOARDMAN, a citizen of the United States, residing at Minneapolis, in the county of Hennepin and State of Minnesota, have invented certain Improvements in Amalgamators and Concentrators for Stamp-Mills, of which the following is a specification.

This invention relates particularly to certain improvements on the machine for which Letters Patent were granted me on the 19th of March, 1878, No. 201,321; and my invention consists in the construction and combination hereinafter described, and particularly pointed out in the claims.

Figure 1:
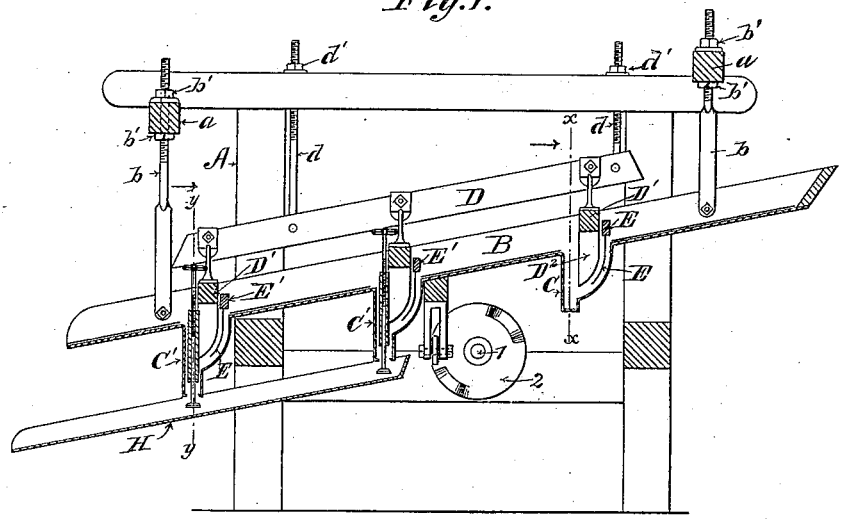
Figure 2:
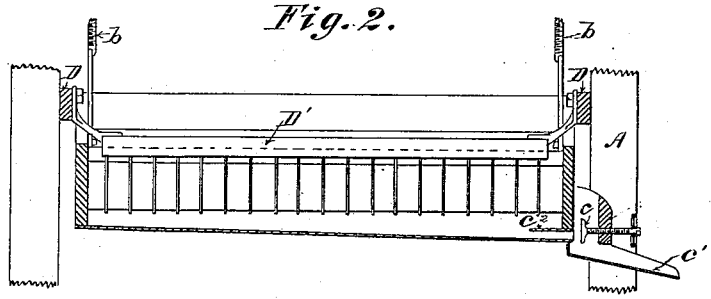
Figure 3:
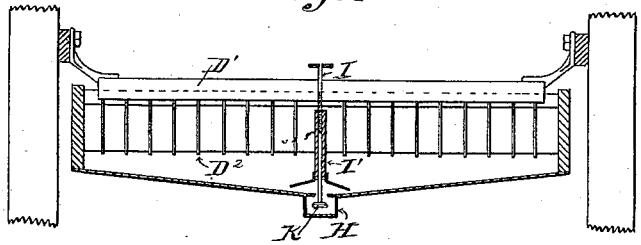

In the accompanying drawings, forming part of this specification, Figure 1 is a longitudinal vertical section of my machine. Fig. 2 is a section on line $x\,x$, Fig. 1. Fig. 3 is a section on line $y\,y$, Fig. 1.

A in the drawings represents the main supporting-frame. It is provided with the cross-timbers $a\,a$, to which the inclined pan B is hung. The pan is preferably secured to rods $b\,b$, that are screw-threaded at their upper ends and have their lower parts formed into flat springs. The threaded ends of the rods pass through the bars $a$, and are held in position by the adjusting-nuts $b'\,b'$. The pan B may be arranged directly in combination with a battery or stamp amalgamator, as shown in my former patent; or there may be one or more separating-plates between the stamp and the pan, the pan in this case being arranged below the lower plate. The pan is supported in an inclined position, as shown, and suitable means—as a shaft, 1, and a wave-wheel, 2—are provided for giving to it a transverse reciprocation. The pan is also provided with a series of depressions or pockets, C, which extend transversely across its bottom. A frame, D, is secured to the frame A, above the pan, by a series of supporting-rods, $d\,d$, provided with adjusting-nuts $d'\,d'$. Bars $D'\,D'$ are attached to the frame D, and from each of these bars depend a series of blades, $D^2$, that extend into the pockets C, and nearly to their bottoms. These blades remain stationary while the pan reciprocates, and therefore serve as agitators to the material in the pockets. I prefer to form the pockets, with the wall over which the pulp passes as it enters the pocket, of the curved shape shown, so that the amalgam will be directed into the lower angle or corner of the pocket.

I find it desirable, in using this machine, to insure the passage of all of the pulp through the lower part of the pocket, as thereby the heavy amalgam reaches the bottom of the pocket, from which it will not rise, while the lighter material flows out of the pocket and down the inclined surface of the pan. For this purpose I provide the partitions E, which are preferably attached to a slat, E', secured to the walls of the pan. The partition E extends nearly to the bottom of the pocket, and it is preferably arranged near to and substantially parallel with that wall of the pocket over which the pulp passes as it enters the pocket. A narrow passage is thus formed between the partition and the wall of the pocket, and through this all of the pulp must pass, being thereby carried nearly to the bottom of the pocket. The gold and quicksilver are collected in the first or upper pocket C, and in order that this material may be removed without the necessity of taking out the agitators and scooping out the contents of the pocket I form the bottom of the pocket on an incline, as shown in Fig. 2, making it thereby into an inclined transverse chute, having an opening through the end wall of the pocket, which may be closed by a suitable screw or other valve, $c$. A plate, $c^2$, projects into the pocket over the opening $c$ and aids in keeping the lighter material from passing out at the opening. The transverse reciprocating movement of the pan causes the amalgam to work down the inclined bottom of the pocket until it can be removed therefrom through the opening $c$. A spout, $c'$, receives the material as it passes through the opening $c$.

I find that the second and third pockets C' of the table serve as concentrators and concentrate a quantity of material that may afterward be reduced by smelting.

The pockets C' are similar to the pocket C, except that the bottom of each slopes in each direction toward the center, and at that point opens into a sluice, H, to which a hose may be connected, whereby a stream of water may be sent through the sluice. A screw-threaded rod, I, passes through a threaded support, I', and carries the valve K, which may be drawn up into the opening in the bottom of the pocket.

I claim as my invention—

1. In combination with the inclined reciprocating pan having transverse pockets or depressions in its bottom, fixed agitators extending downward within the pockets, and partitions extending downward within the pockets and forming passages to direct the pulp to the lower part of the pockets, all substantially as described.

2. The combination, with the inclined pan B, provided with the transverse pocket C, having the curved wall, of the curved partition E, extending downward within said pocket substantially parallel with said wall, and forming therewith a passage to direct the pulp to the lower part of the pocket, substantially as and for the purpose set forth.

3. In a machine of the class described, the combination of the transversely-reciprocating pan B, the pocket C, having the inclined bottom, opening c, valve $c^2$, and the partition E, all substantially as described.

4. The combination, in a machine of the class described, of the pan B, concentrating-pocket C', having a bottom inclined from each end toward the center, the valve K, means for operating said valve, the sluice H, and the partition E, all substantially as described, and for the purpose set forth.

5. The reciprocating pan B, having the pocket C, provided with an inclined bottom, opening c, valve $c^2$, the pockets C', provided with bottoms sloping toward the center, the valve K, and sluice H, in combination with the fixed agitators, and the partitions E, extending downward within said pockets, all substantially as described, and for the purposes set forth.

LORENZO M. BOARDMAN.

In presence of—
JASPER J. HAWKINS,
GEO. McNEIR.